(12) United States Patent
Van Boxel

(10) Patent No.: US 10,655,290 B2
(45) Date of Patent: May 19, 2020

(54) TECHNICAL FISH LOCK

(71) Applicant: J.J. van Boxel Holding B.V., Werkendam (NL)

(72) Inventor: Jan Jacobus Van Boxel, Werkendam (NL)

(73) Assignee: J.J. van Boxel Holding B.V., Werkendam (NL)

( * ) Notice: Subject to any disclaimer, the term of this patent is extended or adjusted under 35 U.S.C. 154(b) by 0 days.

(21) Appl. No.: 16/388,906

(22) Filed: Apr. 19, 2019

(65) Prior Publication Data

US 2019/0323192 A1    Oct. 24, 2019

(30) Foreign Application Priority Data

Apr. 19, 2018  (NL) ..................................... 2020791
Nov. 21, 2018  (NL) ..................................... 2022036

(51) Int. Cl.
*E02B 8/08*    (2006.01)
*A01K 61/10*   (2017.01)

(52) U.S. Cl.
CPC .............. *E02B 8/085* (2013.01); *A01K 61/10* (2017.01)

(58) Field of Classification Search
CPC combination set(s) only.
See application file for complete search history.

(56) References Cited

U.S. PATENT DOCUMENTS

| | | | |
|---|---|---|---|
| 2,121,968 A | 6/1938 | Kuehl | |
| 3,962,876 A | 6/1976 | Phillips | |
| 6,394,699 B1 * | 5/2002 | Neufeld | E02B 8/085 405/81 |
| 8,262,317 B1 * | 9/2012 | Jensen | E02B 8/085 405/83 |
| 2002/0127060 A1 | 9/2002 | Bryan | |
| 2011/0280663 A1 * | 11/2011 | Millard | E02B 8/085 405/81 |
| 2013/0236249 A1 | 9/2013 | Greif et al. | |
| 2016/0017558 A1 | 1/2016 | French, Sr. | |

FOREIGN PATENT DOCUMENTS

| | | |
|---|---|---|
| EP | 2194174 A1 | 6/2010 |
| EP | 2767635 A1 | 8/2014 |
| EP | 3231942 A1 | 10/2017 |
| WO | 2004/007846 A2 | 1/2004 |
| WO | 2010/115423 A2 | 10/2010 |

OTHER PUBLICATIONS

Dec. 12, 2018—Dutch Search Report NL 2020791.

* cited by examiner

*Primary Examiner* — Kyle Armstrong
(74) *Attorney, Agent, or Firm* — Banner & Witcoff, Ltd.

(57) ABSTRACT

Migrating fish often want to travel between different bodies of water, which may be positioned at different heights. To overcome these heights, water passages may be used that provide a water path at a slope over which a fish is able to swim up. A compact housing is provided by allowing a water guide over which the water flow flows to rotate around an axis parallel to gravity in a helical shape. The fish lock may be provided with a resting chamber which comprises a volume of water with a low flow velocity. Sensors and a controller may be provided to control a flow rate of the water through the fish lock according to for example the type of fish passing through the fish lock and an administrator may monitor the fish lock at a distance and may be contacted in case of malfunction.

21 Claims, 6 Drawing Sheets

TECHNICAL FISH LOCK

CROSS-REFERENCE TO RELATED APPLICATIONS

This application claims the benefit of priority under 35 U.S.C. § 119 to Dutch application NL 2020791, filed Apr. 19, 2018, and to Dutch application NL 2022036, filed Nov. 21, 2018. Each of these prior applications is hereby incorporated by reference in its entirety.

FIELD OF THE INVENTION

The invention relates to the field of fish locks arranged for guiding fish from one body of water to another.

BACKGROUND

Fish migrate one or more times in their life, for example from a sea or ocean to fresh water and back or the other way around. Different species of fish may prefer different times in the year to migrate. The different bodies of water through which they migrate usually have different water levels, creating a need for the fish to swim up or down. Manmade barriers such as dams and locks create barriers which fish may not be able to overcome.

Providing a meandering path around or in parallel to such barriers for fish to swim through requires a large surface. EP2767635 discloses an active lift device for transporting fish from a lower situated body of water to a higher situated body of water.

SUMMARY

It is preferred to provide a fish lock that is more efficient.

A first aspect provides a fish lock as an arrangement for guiding fish between a first, lower situated, body of water and a second, higher situated, body of water. The arrangement comprises a housing comprising a first opening and a second opening, wherein when the arrangement is in use the second opening is placed higher with respect to the gravity than the first opening. The housing further comprises a water guide which connects the first opening with the second opening for guiding a flow of water from the second opening to the first opening. Herein the water guide provides when in use a flow trajectory for the flow of water around an axis parallel to the gravity vector. Situated higher is in particular to be understood that the upper level of the second body of water is higher than that of the first body of water.

The first opening may be provided in a plane perpendicular to the gravity vector. The housing may further comprise a base, arranged to, in use, be provided below a water level of the first body of water. The first opening may be provided in said base.

The first opening may be provided with a tube which deflects a direction of the flow of water which has passed the first opening by a pre-determined amount of degrees, for example an angle of 90 degrees such that the direction of the flow of water exiting the tube is perpendicular to the gravity vector. The angle preferably is adjustable.

In embodiments of the fish lock, the housing and the base mark out or define a basin arranged to contain a volume of water between the first opening and the water guide adjacent to the flow of water. The volume of water inside the basin flows significantly less than the water in the flow of water, and as such substantially no water may flow in or out of the contained volume of water.

Preferably, the water guide comprises substantially only curved surfaces. Even more preferably, the water guide comprises only curved surfaces and thus no straight surfaces. A curved surface is defined as a three-dimensional rounded surface, a may be comprised out of a plurality of joined curved surfaces.

The water guide may comprise one or more flow breakers, arranged to decrease a velocity of the water flow.

The housing of the fish lock may be arranged to, in use, provide light of a pre-determined interval of wavelengths to at least a part of an inner space of the fish lock and preferably to at least a part of the flow of water flowing through the fish lock. This may be accomplished by providing one or more light sources in the housing.

At least one of the first opening and the second opening may be provided with a control mechanism arranged to control a flow through surface for the flow of water through at least one of the first opening and the second opening.

At least one of the first opening and the second opening may be provided with at least one sensor arranged to determine at least one of: a water level, the water quality or a pH level of water flowing through at least one of the first opening and the second opening, a temperature of water flowing through the first opening, a flow rate of the flow of water flowing through at least one of the first opening and the second opening, an oxygen level of the water flowing through at least one of the first opening and the second opening, a pollution of water flowing through at least one of the first opening and the second opening, an amount of fish swimming through at least one of the first opening and the second opening over a certain period of time and a species of the fish swimming through at least one of the first opening and the second opening, an ambient temperature of air inside and/or or outside the fish lock, an amount and/or type of particles dissolved in water flowing through at least one of the first opening and the second opening, a transparency of water flowing through at least one of the first opening and the second opening, and an amount of sediment present in water flowing through at least one of the first opening and the second opening. Alternatively or additionally, one or more sensors may be provided at different positions in the fish lock for measuring any one or more of the abovementioned parameters. For each entity, one or more separate sensors may be provided, or, alternatively, several entities may be measured using a single sensor. In the latter case, data sensed may be post-processed to determine information related to multiple entities.

The control mechanism for the flow through surface of the at least one of the first opening and the second opening may be connected with at least one of the sensors such that a signal sent by the at least one of the sensors may be received by the control mechanism, optionally through a controller. The control mechanism may be arranged to, based on the received output of the sensor, control the flow through surface of the flow of water through at least one of the first opening and the second opening.

The flow trajectory may rotate more than 90 degrees, more than 180 degrees, more than 270 degrees, or more than 270 degrees around the axis parallel to the gravity vector.

The fish lock may further comprise a memory module for storing fish migration data, wherein the memory module is readable by the control mechanism, and the control mechanism is arranged to control the flow through surface of the flow of water through the second opening based on the read fish migration data. The memory module allows a user, such as an administrator, to provide the fish lock with the fish migration data required for more optimal control of the water flow through the fish lock.

When the fish lock comprises the memory module, the control mechanism may be arranged for adjusting fish migration data stored on the memory module based on the received output from the at least one sensor.

As such, the fish migration data may be updated using real-life data and as such may be made more reliable.

The water guide may be at least partially provided with a layer with a plurality of extending fibres, such as artificial grass, artificial weed, artificial turf, other artificial plant-like material or a combination thereof. Alternatively or additionally, a layer may be provided that allows for growth of natural plant material. Such a layer may provide a reduced turbulence in the flow of water flowing over the water guide which may increase the ease with which fish may swim up the flow of water. Furthermore, such a layer may provide a more natural environment, in particular at the bottom, for fish swimming through the flow of water flowing over the water guide and especially for species of fish which prefer to swim over or near the bottom of a body of water. Such a layer may also increase the uptake of oxygen of the flow of water by a change in texture of the surface of the flow of water.

The water guide may be provided with one or more panels substantially perpendicular to a flow trajectory defined by the water guide, the panels comprising gates defined in the panels for passing a flow of water. The one or more gates may be provided with a resilient member, wherein the resilient member at least partially defines a flow through area within the gate for the flow of water, and the resilient member is arranged to resiliently deform under influence of a pressure provided by the flow of water.

The fish lock may comprise at least a first panel comprising a first gate and a second panel comprising a second gate, wherein the first gate may be provided at or near an inner radius of the water guide, and the second gate may be provided at or near an outer radius of the water guide.

One or both of the first opening and the second opening may be provided with a control mechanism for controlling a flow through surface for the flow of water through the opening, wherein the control mechanism may be arranged to control a width of the flow through surface.

Embodiments of the fish lock may comprise a bypass trajectory arranged to provide an additional flow path parallel to the water guide between the inlet end and the outlet end through the first opening, wherein the bypass trajectory may comprise a bypass flow control mechanism for controlling the flow through at least part of the bypass trajectory.

A second aspect provides an assembly of at least two fish locks as arrangements according to any of the described embodiments, wherein the second opening of a first fish lock is connected to a first opening of a second fish lock for providing a flow of water for fish between a second opening of a second fish lock and a first opening of the first fish lock. Any number of fish locks may be connected in order to provide a guide for fish over any height differences between two bodies of water.

BRIEF DESCRIPTION OF THE FIGURES

The various aspects and embodiments thereof will now be discussed in conjunction with drawings. In the drawings.

DETAILED DESCRIPTION OF THE EMBODIMENTS

Figure 1A:
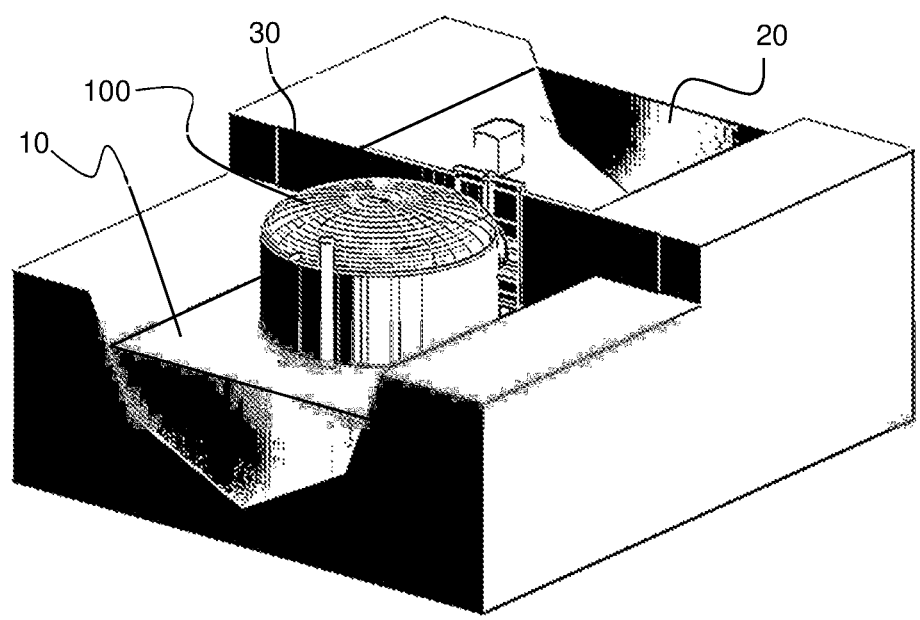
FIG. 1A depicts a fish lock in a body of water.

FIG. 1A shows a first body of water 10 and a second body of water 20, which are separated by a dam 30. In another embodiment, another separation may be provided, like a ship lock or a weir. A water level of the first body of water 10 is lower than a water level of the second body of water 20. Provided at least partially in the first body of water 10 is a fish lock 100, which is arranged to allow fish to pass from the first body of water 10 to the second body of water 20 and/or from the second body of water 10 to the first body of water 10.

The fish lock 100 is arranged to guide fish between the first body of water 10 and the second body of water 20 and allows fish to overcome the height difference between the water level of the first body of water 10 and the water level of the second body of water 20 more easily.

Figure 1B:
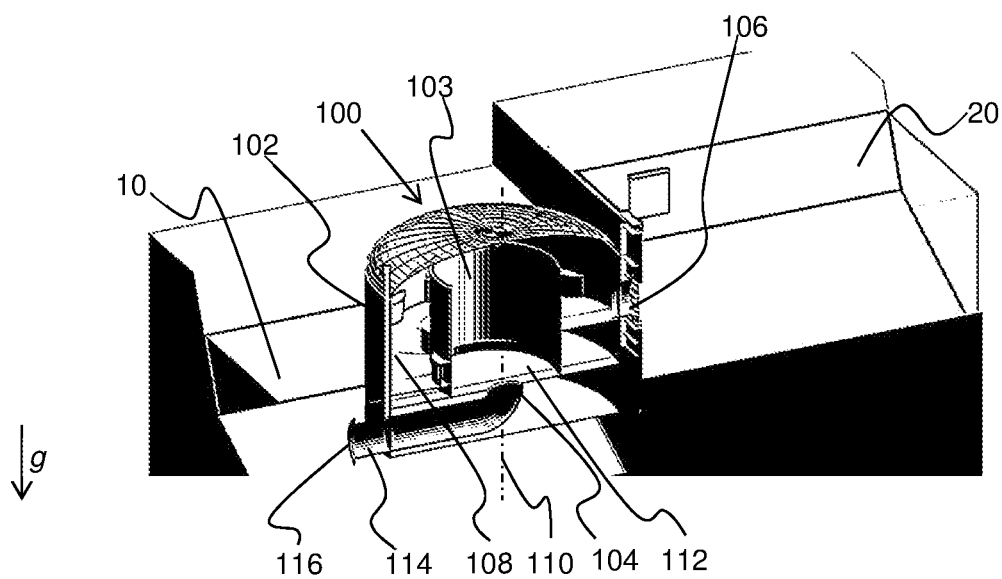
FIG. 1B depicts a section view of the fish lock.

FIG. 1B shows a section view of the fish lock 100 provided in the first body of water 10. The fish lock 100 comprises a housing 102 which comprises a first opening 104 and a second opening 106. When the fish lock 100 is in use, the first opening 104 is provided in fluid communication with the first body of water 10 and the second opening 106 is provided in fluid communication with the second body of water 20. This orientation of the fish lock 100 results in the second opening 106 being provided higher with respect to the gravity than the first opening 104.

For a fish in the first body of water 10 trying to swim towards the second body of water 20, the first opening 104 may act as an entrance of the fish lock 100 and second opening 106 may act as an exit of the fish lock 100. Similarly, for a fish in the second body of water 20 trying to swim towards the first body of water 10, the second opening 106 may act as an entrance of the fish lock 100 and the first opening 104 may act as an exit of the first lock 100.

The housing 102 further comprises a water guide 108, which is arranged to connect the first opening 104 and the second opening 106 for providing a water flow from the second opening 106 down to the first opening 104. The water guide 108 may provide, in use, a flow trajectory for the water flow around an axis 110 parallel to the gravity vector g. The flow trajectory is defined as the general trajectory that the water flow follows when flowing from the second opening 106 to the first opening 104. The position of the axis 110 may be anywhere within the housing 102, yet preferably in the centre.

The flow trajectory around the axis 110 may be shaped as a three-dimensional helix or spiral-like curve, comprising curved and optionally straight sections. Preferably, the flow trajectory encircles the axis 110 with at least 180 degrees, even more preferably with at least 270 degrees. In other envisioned embodiments, the flow trajectory spirals around the axis 110 with more than 270, or even more than 360 degrees. Optionally, the spiral may decrease and/or increase in radius over at least a part of its rotation around the axis 110 resembling the shape of a conical or tapered spring.

Similar to how a spiral staircase demands less area in a house than a straight set of stairs, the arrangement of the flow trajectory around the axis 110 allows the fish lock 100 to be compact and more compact than the known meandering flow paths allowing fish to swim upstream parallel to for example a ship lock.

Figure 1C:
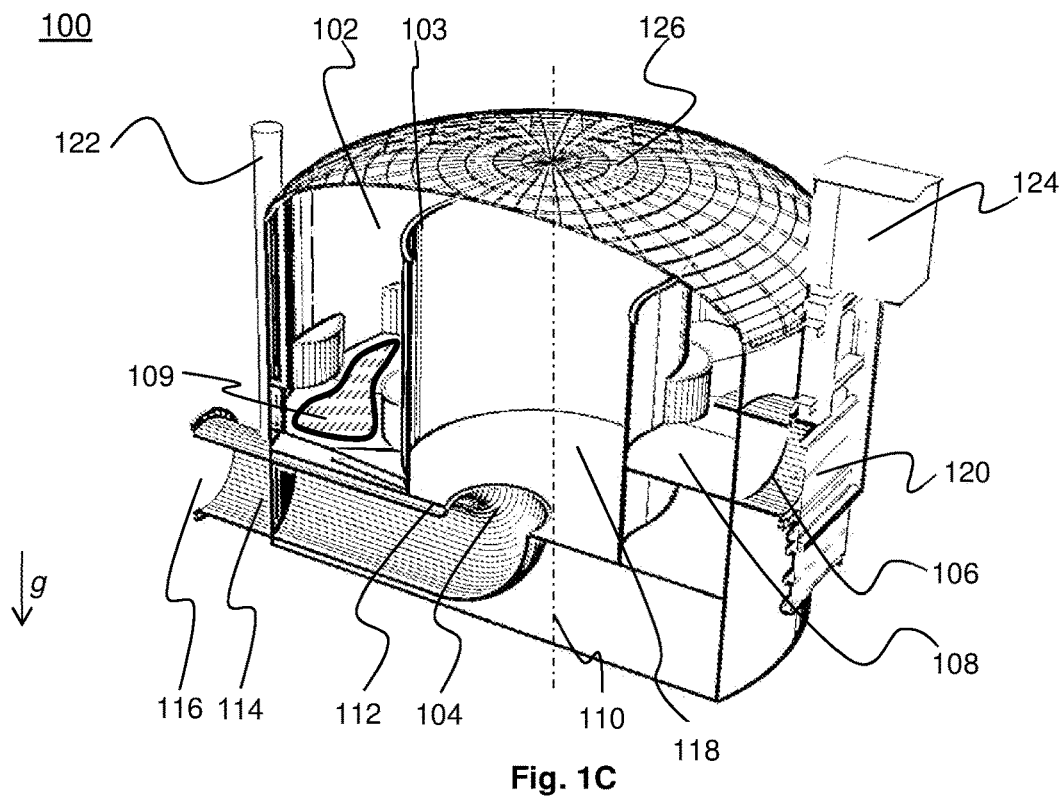
FIG. 1C depicts a detailed section view of the fish lock.
Figure 1D:
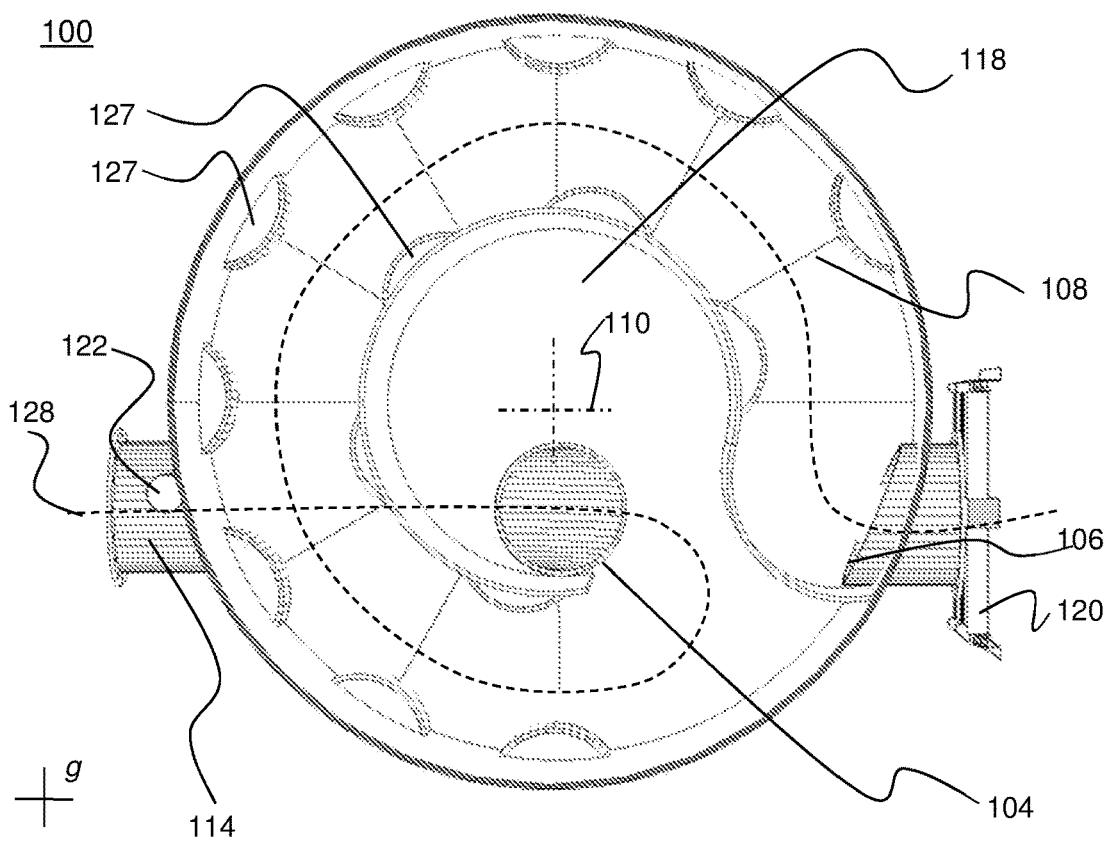
FIG. 1D depicts a top view of the fish lock.

The total flow trajectory of the water flow through the fish lock 100 may, when projected onto a plane perpendicular to the gravity vector g, cross itself as will become apparent from the flow trajectory 128 shown in FIG. 1D.

In the embodiment of the fish lock 100 as shown in FIG. 1B, the housing 102 comprises an inner housing part 103. The water guide 108 is provided between the housing 102 and the inner housing part 103.

The flow trajectory has to bridge the water level difference between the first body of water 10 and the second body of water 20 over the length of the flow trajectory. Yet, the difference between a first end of the flow trajectory does not have to be equal to the water level difference between the first body of water 10 and the second body of water 20; it may be less or more. The first opening 104 may be provided slightly below the upper level of the first body of water 10 and the second opening 106 may be provided slightly below the bottom of the second body of water 20—or the other way around.

A larger length of the flow trajectory provides a lower average slope of the water flow between the second opening 106 and the first opening 104, which may decrease the effort required for a fish to swim from the first opening 104 to the second opening 106. Depending on a desired maximum slope of the water flow, the dimension of the fish lock 100 and the dimensions of the water guide 108 may be determined.

In an embodiment of the fish lock 100, the first opening 104 is provided in a plane substantially perpendicular to the gravity vector g. This may allow the fish lock 100 to be more compact. Alternatively, the first opening 104 is provided in a plane that is in use vertical.

Optionally, the housing 102 of the fish lock 100 comprises a base 112 which, when the fish lock 100 is provided in a body of water, is arranged to be under the upper level of the body of water in which the fish lock 100 is provided. When the housing 102 comprises the base 112, the first opening 104 may be provided as an opening in the base 112.

Water having flown through the water guide 108 will subsequently flow through the first opening 104. This flow will attract fish that want to swim upstream and the fish will swim through the first opening 104. Subsequently, with the base 112 being under the water level, fish will be able to accommodate to the fish lock 100 in a body of water above the base 112.

As a further option, the fish lock 100 may comprise a tube 114, extending from the first opening 104 away from the fish lock 100. The tube 114 may be arranged such that the part of the flow path between the first opening 104 and a tube opening 116 is bent by approximately 90 degrees. If the fish lock 100 comprises the tube 114, the tube opening 116 functions as an entrance or exit for fish to enter the fish lock 100.

If the first opening 104 is provided in a plane substantially perpendicular to the gravity vector g, the tube 114 may comprise a bend of about ninety degrees, from vertical at the base 112 to horizontal at a distal end. If the first opening 104 is provided in a plane that is in use vertical, such bend may not be present.

Now referring to FIG. 1C which shows a detailed section view of an embodiment the fish lock 100, the fish lock 100 comprises a basin 118. The basin 118 is marked out by at least part of the inner housing part 103 and at least part of the base 112. In the basin 118, a volume of water may be contained, wherein said volume of water is relatively sheltered from the water flow which flows through the fish lock 100, from the second opening 106 to the first opening 104.

Herewith, the basin 118 provides a volume of water in which a fish travelling through the fish lock 100 needs to provide less energy in swimming than in the water flow hence allowing a place for a fish to rest. Especially when a velocity of the water flow is high, or when the fish travels through multiple fish locks, a place of rest is advantageous for fish that are travelling from a lower body of water to a higher body of water. In one embodiment, the basin 118 is arranged to provide an area in which the velocity of water streaming is zero or close to zero.

The second opening 106 may be provided with a sliding mechanism 120 as a control mechanism for controlling a flow through surface for the flow of water through the second opening 106. By sliding a slider comprised by the sliding mechanism 120 up, the flow through surface of the second opening 106 may be decreased. By sliding the slider down, the flow through surface of the second opening 106 may be increased up to the point where the sliders is slid away from the second opening 106. Controlling the flow through surface of the flow of water through the second opening 106 allows the flow rate of the flow of water to be controlled.

In this embodiment, fish exit the fish lock 100 at or near the water surface of the second body of water. In another embodiment, the sliding mechanism 120 of a valve for controlling flow through the second opening opens at or near the bottom of the second opening 106, which may be located at or near the bottom of the second body of water 20—or higher. In this latter embodiment, the fish may exit the fish lock at the bottom of the second opening 106 and, optionally, at or near the bottom of the second body of water 20.

The sliding mechanism 120 may be connected to a spindle and a spindle motor, wherein rotating the spindle one way causes the sliding mechanism 120 to go up, and rotating the spindle the other way causes the sliding mechanism 120 to go down.

The first opening 104 or the tube 114 may be provided with a measuring tube 122 as a sensor for determining one or more of: a water level, a water quality, pH value, a temperature of water and/or air, a flow rate, an oxygen level, and a contamination level of water flowing through the first opening 104 or the tube 114. Furthermore, the measuring tube 122 as the sensor may be arranged for determining an amount of fish passing through the tube 114 or first opening 104 over a certain time interval, and the species of a fish swimming through the tube 114 or the first opening 104.

To identify the amount of fish passing through and/or the species of said fish the sensor may comprise one or more cameras, optionally provided with one or more light sources. The cameras may be coupled to processing units arranged for image detection for defining particular species of fish. Different sensors may be provided at different positions in the fish lock 100, for measuring one or more of the different parameters at multiple positions.

The fish lock may further be provided with an environmental DNA (eDNA) sensor as a sensor for sampling DNA expelled by organisms passing by the eDNA sensor. The eDNA sensor may thus provide data on the species of organisms which have passed by the eDNA sensor, as will be appreciated by a person skilled in the art.

The control mechanism may be provided with a controller 124, for example a PLC controller, a microcontroller, a microprocessor or other, comprising an input for receiving a signal from any of the sensors. The controller 124 may also comprise an output for sending a signal to a receiver outside the fish lock 100, for example to a manager of the fish lock 100. The signal may be sent over a wired connection, such as the internet or a local area network, or over a wireless connection such a mobile data connection, for example GPRS, 3G, 4G, and 5G, or using Bluetooth or a radio signal.

The controller 124 may further be used to control the light source optionally provided with the fish lock 100, for example by detecting outside light levels and when these levels drop below a certain threshold, activating the light source.

Different flow rates may be advantageous for different types of fish, which may be using the fish lock 100 in different periods of the year. The controller 124 may be arranged to compensate the flow rate for the seasonal migration of one or more specific species of fish.

The controller 124 may be arranged to automatically send data to the manager every certain period of time, or when unexpected values are measured by the sensor, such as high pollution levels or a low flow rate. The controller 124 may also optionally be arranged to communicate with a dam, lock or sluice which controls the water level of the first body of water 10 and/or the second body of water 20. With this communication the flow rate of the flow of water may be controlled, and it may be prevented that the water level inside the fish lock 100 drops below a level wherein fish are unable to enter and/or exit the fish lock 100.

For detecting a pollution level in a flow of water, an array comprising two or more sensors may be used. Any sensor may be used in such an array, as long as the sensor is arranged to measure a variable which relates to a pollution level. By comparing measured variables related to a pollution level from different sensors, which may be provided at different locations, a pollution level may be determined.

The controller 124 may comprise a processing unit, arranged to process data received from the one or more sensors. By analysing the received data, patterns and correlations may be determined which may be used for automatic control of the fish lock 100.

The controller 124 may further comprise a memory unit arranged for storing fish migration data on. Such fish migration data may be provided by a user and may be used by the controller 124 to control the flow rate within the fish lock 100. Fish migration data may comprise data related to specific species of fish and the dates, such as weeks or months, within a year in which they are expected to migrate through the fish lock 100. Such data may comprise one or more of flow rates, water temperatures, water level of the first body of water 10, water level of the second body of water 20, and ambient air temperatures per species of fish or groups of species in which they are expected to want to migrate through the fish lock 100. Alternatively or additionally, the fish migration data may comprise temperature data or other data that may be sensed. Hence, pre-determined fish migration periods may, per species, be defined by time, by water temperature, by other data that may be sensed, other, or a combination thereof. The pre-determined data may later be amended using particular rules.

When provided with fish migration data, the controller 124 may be arranged for comparing the user provided migration data with data received from the sensors, for example from a camera or eDNA sensor arranged for detecting amounts of fish migrating through the fish lock 100 and the species to which the detected fish belong. Using this new fish migration data, the controller 124 may adapt to even further optimise the flow rate of water through the fish lock 100 for certain species of fish at certain periods in the year.

Furthermore, the fish migration data received from a user or otherwise as stored in the memory unit may be adapted based on data sensed. In one embodiment, the data stored in the memory module commands a particular flow rate during a particular time of the year over a particular period—days, weeks or months—to facilitate migration of a particular species. Using data obtained by means of one or more sensors—oxygen level, water temperature, outside air temperature, other, or a combination thereof—, the particular period of time may be shifted, extended or compressed. The changes of the particular period may be made on particular rules, which may be present in de memory module. The rules are processed by the controller 124.

Furthermore, the particular period may be adjusted based on adjustments of other periods for which another flow rate may be required to accommodate migration of further species. This adjustment may require balancing between two species. To enable balancing, priorities may be given to a first species of fish, over a second species. Reasons may be to facilitate population growth of the first species, possibly at the cost of the second species. During the prioritisation process, it may be determined that a first period of a first flow for a first species is extended or shifted further in time, in view of temperature conditions. This may conflict with a subsequent second period with a second flowrate for a second species that may be solved using prioritisation.

Extension of shift of the first species further in time may result to compression of the second period by starting the second period later or in shift of the second time period, potentially at the cost of a subsequent third period for a third species if the third priority of the third species is lower than the second priority of the second species. If the second priority is lower than the third priority, the third priority is started as intended—optionally dependent on environmental conditions—, resulting in compression of the second time period.

Prioritisation may also be used to eradicate particular unwanted, potentially exotic, species of fish or other water animals from an aquatic environment. The latter may be achieved by closing the fish lock 100 during a migration period—determined in time, by temperature and/or another measured or measurable entity—or by providing a flow rate not suitable to the unwanted species.

Components comprised by the fish lock 100 that require electrical energy may be powered by a local electricity grid, or may be provided with a power source comprised by the fish lock 100. Such a power source may comprise means for converting solar irradiation and/or means for converting kinetic energy from a flow of water into electricity. Optionally, an energy storage device such as a battery may be provided to supply energy to the controller 124, sensors, control mechanism and/or any other component of the fish lock 100 requiring electrical energy.

In an embodiment of the fish lock 100, when the sensor has detected a pollution level above a certain threshold, a signal is sent to and received by the controller 124. The controller 124 then provides a temporarily high flow rate for the flow of water in an attempt to clean the fish lock 100 of the pollution. Feedback may be provided by the sensor when the pollution level has decreased again below a pre-determined threshold. If the pollution level does not decrease below the pre-determined threshold, a signal may be sent to the manager of the fish lock 100 and the manager may perform an inspection to identify possible problems.

In another, alternative or additional, embodiment, the flow within the water guide 108 is measured. The measured water flow rate is compared to an expected flow, based on the opening rate of the sliding mechanism 120 by the controller 124. If the measured flow rate is lower than the expected flow rate, there may be obstacles in the water guide 108. Hence, if the difference between the measured flow rate and the flow rated expected based on the position of the sliding mechanism 120 is more than a pre-determined amount, the sliding mechanism 120 is closed and subsequently fully opened for a particular amount of time—one to five minutes, one or five to ten minutes or one to thirty minutes—and subsequently closed. This allows the water guide 108 to be flushed.

After this cleaning sequence, the operation of the fish lock 100 returns to normal and the position of the sliding mechanism 120 is returned to a particular position depending on regular parameters like time of the year, water temperature, other, or a combination thereof. During the normal operation, the flow rate in the water guide 108 is measured again and compared again to an expected flow rate. If the measured flow rate and the expected flow rate vary again by more than the pre-determined difference amount, a message is sent to a manager of the fish lock 100 by the controller 124.

Embodiments of the fish lock 100 may comprise a transparent roof 126 allowing the housing 102 to provide light of a pre-determined wavelength or interval of wavelengths. The transparent roof 126 reflects outside light of unwanted wavelengths, and only allows light of wanted wavelengths to pass through to the inside of the housing 102. Alternatively, a light source may be provided in the housing 102, wherein said light source is arranged to provide light of the pre-determined wavelength or interval of wavelengths to at least part of the flow of water.

A combination of the transparent roof and one or more light sources is also envisioned, wherein for example during the day sunlight passing through the roof provides the light to at least part of the flow of water, and during the night the light sources are used for providing the light.

Light of the pre-determined wavelength or interval of wavelengths may be used to attract fish to enter and/or pass through the fish lock 100 and/or may provide a relaxing effect to fish. To attract fish to enter the fish lock 100, the light may be provided to at least the entrance of the fish lock 100, for example the first opening 104 or the tube opening 116.

It is know that fish are attracted to green light and regard green water as being safe from for example predators, and therefor the pre-determined interval of light wavelengths may comprise green light, wherein green light may lie, without limitation, approximately between 580 and 480 nanometres.

At least part of the water guide 108 may be covered with artificial grass 109 as a layer with extending fibres. Alternatively or additionally, at least part of the water guide 108 may be covered with real grass or other water vegetation or aquatic plants. Next to, or instead of, covering the at least part of the water guide 108, the basin 118 may be covered with any of the layers with extending fibres.

FIG. 1D shows a top view of an embodiment of the fish lock 100. The fish lock 100 is provided with a plurality of flow breakers 127 arranged to decrease the velocity of the flow of water over the water guide 108. The flow breakers 127 may be arranged to create turbulences in the flow of water which may decrease the energy in the flow of water making it easier for a fish to swim upstream towards the second opening 106. In the top view of FIG. 1D, the flow trajectory 128 is shown as a dashed line, wherein the dashed line only indicates an average flow trajectory.

Furthermore, round or rounded objects deflect signals that may otherwise reach the lateral line of fish. Reception of signals by the lateral organ of fish may provide an indication of swimming close to an obstacle, like a wall. Deflection of any signals, like vibrations or pressure gradients by rounded objects may provide fish with a sense of swimming through open water rather than a narrow channel provided by the fish lock 100. This provides fish with a more comfortable feeling in the fish lock 100 which, in turn, may result in more frequent use of the fish lock 100.

As shown in FIG. 1D, the embodiment of the fish lock 100 is arranged such that the water guide 108 comprises substantially only curved surfaces, such as the curved flow breakers 127. The curved surfaces provide that a fish travelling through the fish lock 100 substantially only sees curved surfaces with his lateral line used to detect movement, vibration, and pressure gradients in the surrounding water. As discussed above, straight surfaces are known to increase stress levels in fish as they are prone to reflect signals sent and received by the lateral line more than curved surfaces, which deflect signals more creating the illusion of a more spacious environment for fish.

The fish lock 100 and/or components comprised by the fish lock 100 such as the housing 102 may comprise polymer materials, such as recycled plastics, though other components like metal, wood, other, or a combination thereof may be envisaged as well.

A size of a fish lock, for example a diameter, may be related to at least one of a drop in water level for which the fish lock is intended to provide a passage for fish, and a flow rate of the water. As the drop increases, and as the flow rate increases, the size of the fish lock may be increased as well. If the size of the fish lock would grow too large due to a high drop and/or flow rate, an assembly of interconnected fish locks may be used.

Figure 2:
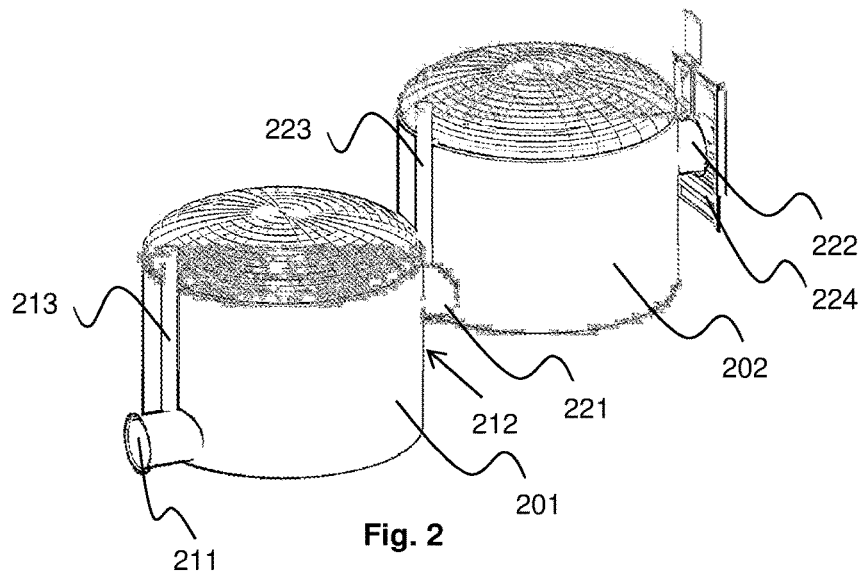
FIG. 2 depicts an assembly of fish locks.

FIG. 2 shows an assembly 200 of fish locks, comprising a first fish lock 201 according to any of the embodiments in this description and a second fish lock 202 according to any of the embodiment in this description. In the assembly 200, the second opening 212 of the first fish lock 201 is connected to the first opening 221 of the second fish lock 202. With this connection, a flow path may be provided between a second opening 222 of the second fish lock 202 and a first opening 211 of the first fish lock 201.

The first fish lock 201 may comprise a first set of sensors 213, and the second fish lock 202 may comprise a second set of sensors 223. The second opening 222 of the second fish lock 202 may comprise a control mechanism 224 arranged for controlling a flow through surface of the second opening 222 of the second fish lock 202 for controlling a flow rate of water flowing through said second opening 222. The control mechanism 224 may be arranged for receiving one or more signals from the first set of sensors 213 and/or the second set of sensors 223 and may be provided with a controller which may control the control mechanism 224 according to one or more of the received signals.

Assemblies comprising more than two fish locks are also envisioned, and may be required when even higher height differences are to be overcome. Furthermore, an assembly may comprise fish locks of any combination of the different fish lock embodiments.

Figure 3:
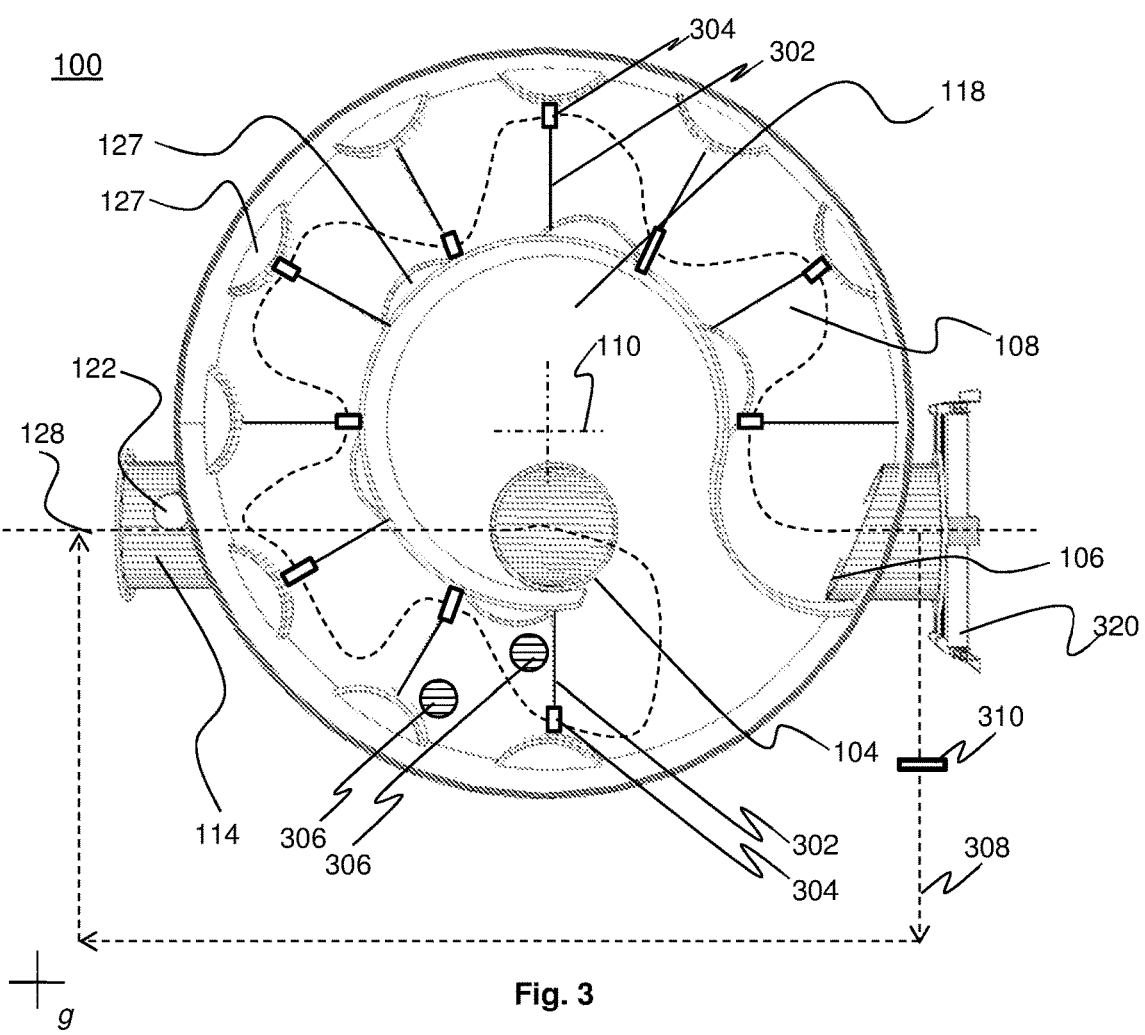
FIG. 3 shows another embodiment of a fish lock.

FIG. 3 shows an embodiment of a fish lock 100, wherein the flow trajectory 128 is different from the flow trajectory 128 as shown in FIG. 1D. The flow trajectory 128 is manipulated by one or more barriers 302 as panels, and by virtue of the barrier 302 the flow trajectory 128 is guided through one or more gates 304 provided in the barriers 302. The particular embodiment of the fish lock 100 as shown in FIG. 3 comprises ten sets of barriers 302 and gates 304, of which two sets are indicated with reference numerals. However, fish locks 100 comprising any number of barrier 302 and any number of gates 304 may be envisioned.

In the embodiment of the fish lock 100 of FIG. 3, the barriers 302 and gates 304 are provided such that an alternating pattern of gates 304 at an inner radius of the water guide 108 and at an outer radius of the water guide 108 is provided. By virtue of this placement, low turbulence areas 306 are created in which a flow velocity of the water flow through the fish lock 100 is lower than over the flow trajectory 128. These low turbulence areas 306, of which only two examples are shown in FIG. 3, may provide a resting place for fish travelling through the fish lock 100.

Whereas in FIG. 3, the sets of barriers 302 and gates 304 are positioned substantially aligned with the flow breakers 127, in other embodiments of the fish lock 100, the sets of barriers 302 and gates 304 may be positioned anywhere along the water guide 108. The barriers 302 may also be provided without the flow breakers 127.

The embodiment of FIG. 3 shows another optional feature, as at the second opening 106 a bypass trajectory 308 is provided, which is arranged to provide a second flow trajectory for water between the second body of water and the first body of water next to the flow trajectory 128. The bypass trajectory 308 is arranged to decrease the flow rate of water through the fish lock 100, for example when a decrease in flow rate of water through the fish lock 100 is desired by a particular species of fish.

For controlling the flow rate through the bypass trajectory 308, a bypass flow control mechanism 310 is provided somewhere in the bypass trajectory 308. This bypass flow control mechanism 310 may be placed in a closed setting, wherein it substantially blocks the flow through the bypass trajectory 308. Further workings of the bypass flow control mechanism 310 will be explained in conjunction with FIGS. 6A and 6B.

The flow of water which has flown through the bypass trajectory 308 may constitute a luring flow around or through the tube 114 or the inlet opening 104 to lure fish to enter the fish lock 100. For example the luring flow is preferably provided at such magnitude that the total flow through the fish lock, being the luring flow and the flow through the water guide 108, is at least 10% of a main flow through a ship lock or a weir that is provided in parallel to the fish lock 100.

Figure 4A:
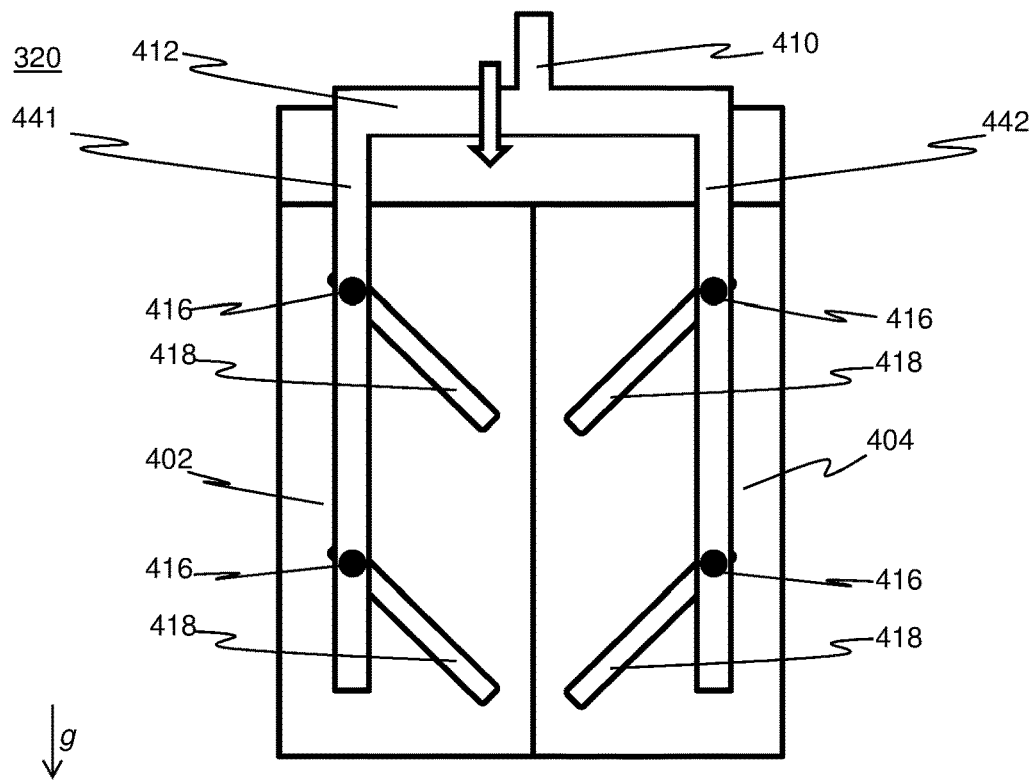
FIGS. 4A and 4B show an embodiment of a horizontal sliding door assembly.
Figure 4B:
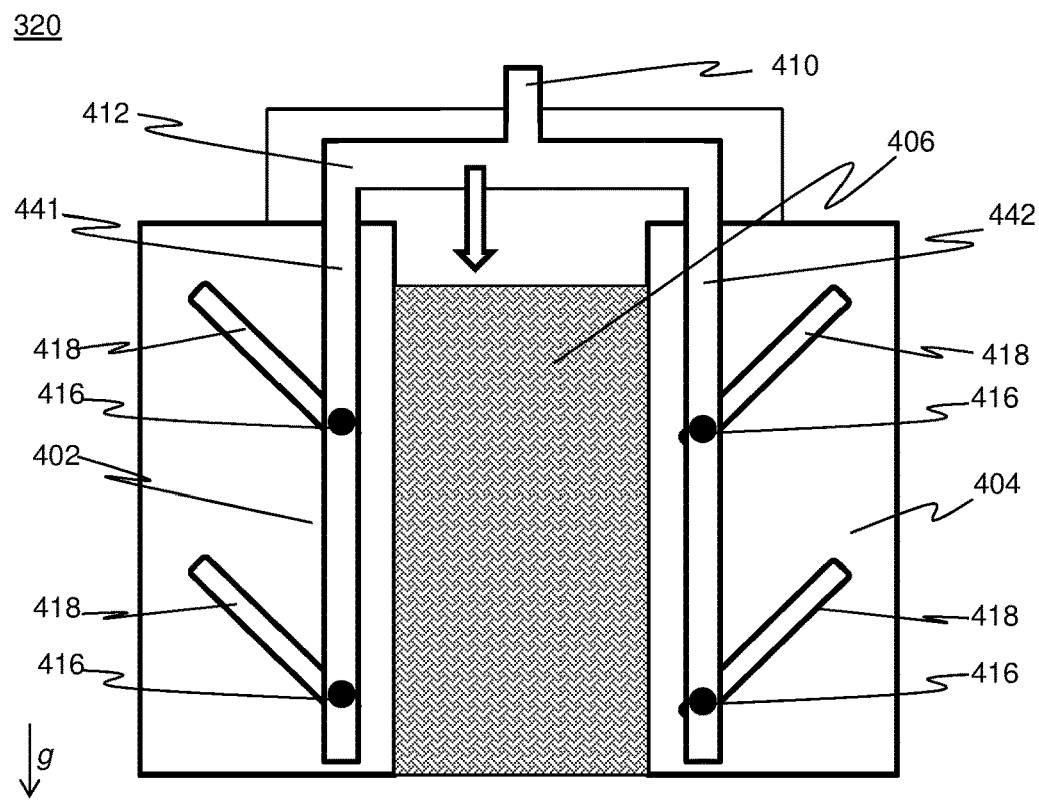

FIGS. 4A and 4B show an embodiment of a horizontal sliding door assembly 320 as a control mechanism for controlling a flow through area for the flow of water through the second opening 106, comprising a first door 402 and a second door 404. The assembly 320 is in FIG. 4A shown in a closed position, wherein substantially no water is allowed to flow into the fish lock 100 through the horizontal sliding door assembly 320 as a control mechanism for controlling a flow through area for the flow of water through the second opening 106.

In the first door 402 and the second door 404, diagonal abutment members 418 are provided, which may be implemented as slits or protrusions; in this implementation, they are implemented as slits. In the middle of the assembly, a central actuation member 410 is provided. To the central actuation member 410, a horizontal actuation member 412 is provided, from which a first vertical actuation member 441 and a second vertical actuation member 442 protrude.

At the vertical actuation members 441 and 442, guiding members 416 are provided. The guiding members 416 are arranged to engage with the diagonal abutment members 418. In the implementation shown by FIG. 4A, the guiding members 416 are implemented as pins that fit in the abutment members 418.

By actuating the central actuation member 410 in the direction of the block arrow by a door driving unit, vertical movement of the central actuation member 410 is by means of the guiding members and the abutment members translated to a horizontal movement of the first door 402 and the second door 404. Whereas in this implementation two doors are disclosed, also one or more than two doors may be slidably operated in this way.

In FIG. 4B, the assembly 320 is shown in an opened position, wherein between the first door 402 and the second door 404 a flow through surface 406 is provided for a flow of water to enter the fish lock 100. The first door 402 and the second door 404 are shown in a fully opened position, with the guiding members at lower and centre extremities of the abutment members.

An advantage of horizontally sliding doors, preferably combined with a flow through opening with a greater height than width, is that it makes the assembly 320 more suitable for accommodating the passage of fish since fish are often also shaped having a greater height than width. The horizontal sliding door assembly 320 is thus arranged to control a width of the flow through surface 406. Furthermore, the flow of water through the fish lock may be controlled, without varying depth of the flow through opening. This means that fish may pass irrespective from any preferred swimming depth.

Using a control mechanism driving the door driving module, thus controlling the width of the flow through surface 406, for any width of the flow through surface 406, the height of the flow through surface 406 remains the same. Not having a change in height may result in lower turbulence in the flow passing through the assembly 320.

It will be apparent to the skilled person that also other mechanisms may be used for controlling operation of the first door 402 and the second door 404 or any other single or multiple doors in a horizontal movement. And whereas horizontally sliding doors are preferred, vertically or diagonally sliding doors or doors swivelling in any direction are not excluded.

Figure 5A:
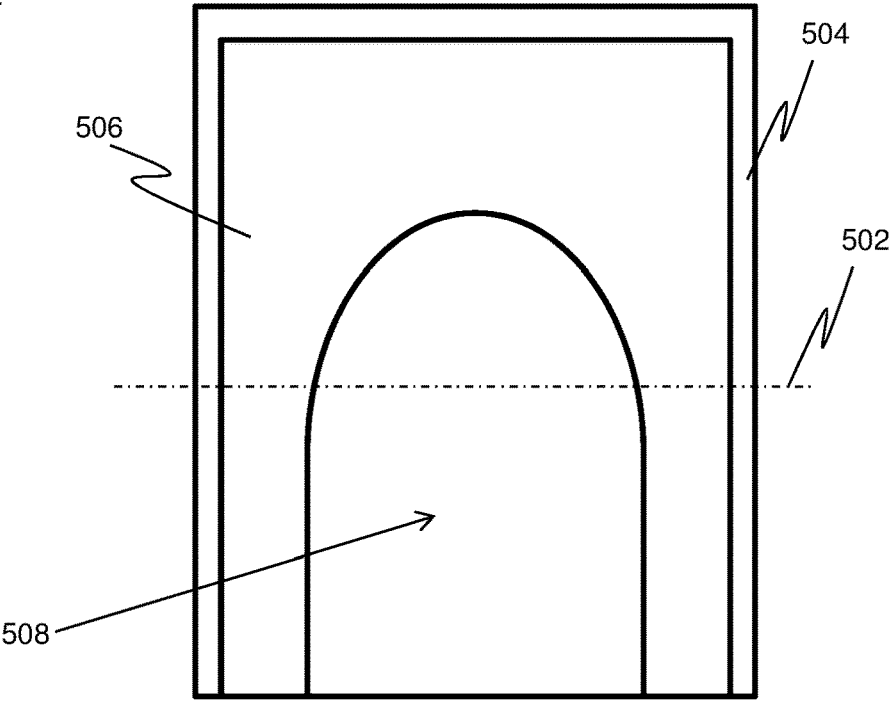
FIGS. 5A and 5B show an embodiment of a gate.
Figure 5B:
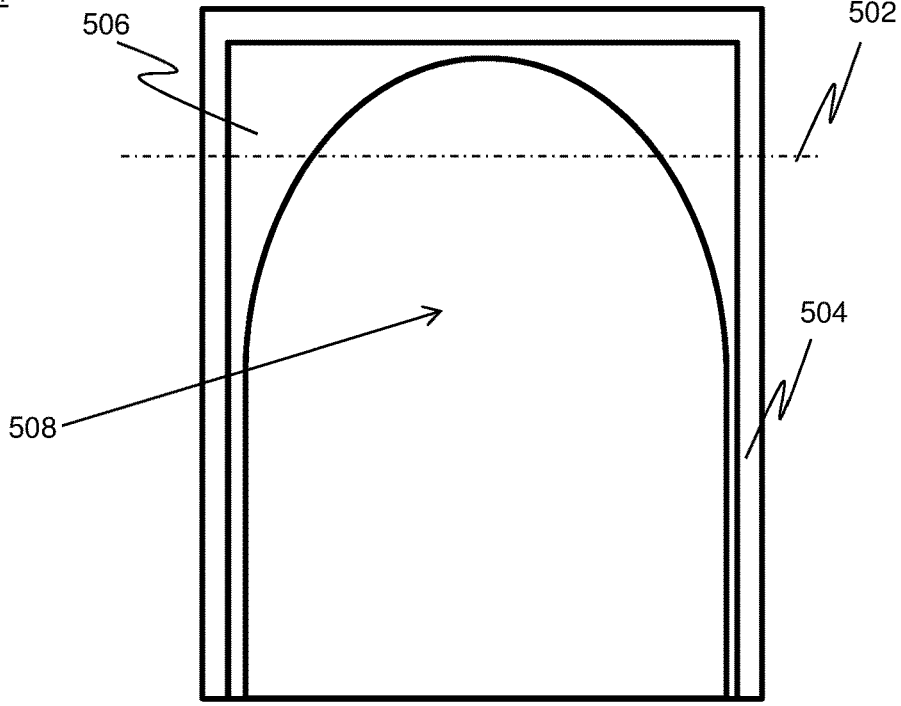

FIGS. 5A and 5B show an embodiment of a gate 304 which may be provided in an embodiment of the fish lock 100, for example in the embodiment of the fish lock 100 as shown in FIG. 3. The gate 304 comprises a frame 504, and attached to the frame 504 a resilient member 506 is arranged to elastically deform under influence of a flow of water through the gate 304. This resilient member provides a portal providing a flow through area 508 for water to flow through and fish to swim through.

The gate 304 in FIG. 5A is shown in a condition where a water level 502 of the water flow through the fish lock 100 is relatively low, and the gate 304 in FIG. 5B is shown in a condition where the water level 502 of the water flow through the fish lock 100 is relatively high. With the rising water level 502, the pressure on the resilient member 506 increases. At some point, the pressure on the resilient member 506 is sufficiently high to at least partially bend the resilient member 506 out of the way to create a larger flow through surface for the flow of water through the gate 304. It is noted that in most cases, the flow of water and the pressure exerted by the water on the resilient members 506 increases with the level of the water in the water guide 108 but this may not necessarily be always the case.

When comparing the situations as sketched in FIGS. 5A and 5B, respectively, the water level 502 of the flow of water through the fish lock 100 over trajectory 128 has risen. The rise has constituted in an increase pressure on the resilient member 506. In a situation where the flow of water points into the paper when regarding FIGS. 5A and 5B, the resilient member 506 has been bended into the paper as well, resulting in an increase flow through area 508.

In an embodiment of the gate 304, the flow of water through the gate 304 constitutes in a movement of the resilient member 506. Such movement may result in a decrease in turbulence of the flow of water passing through the gate 304 by virtue of the dampening effect of the resilient member 506.

Figure 6A:
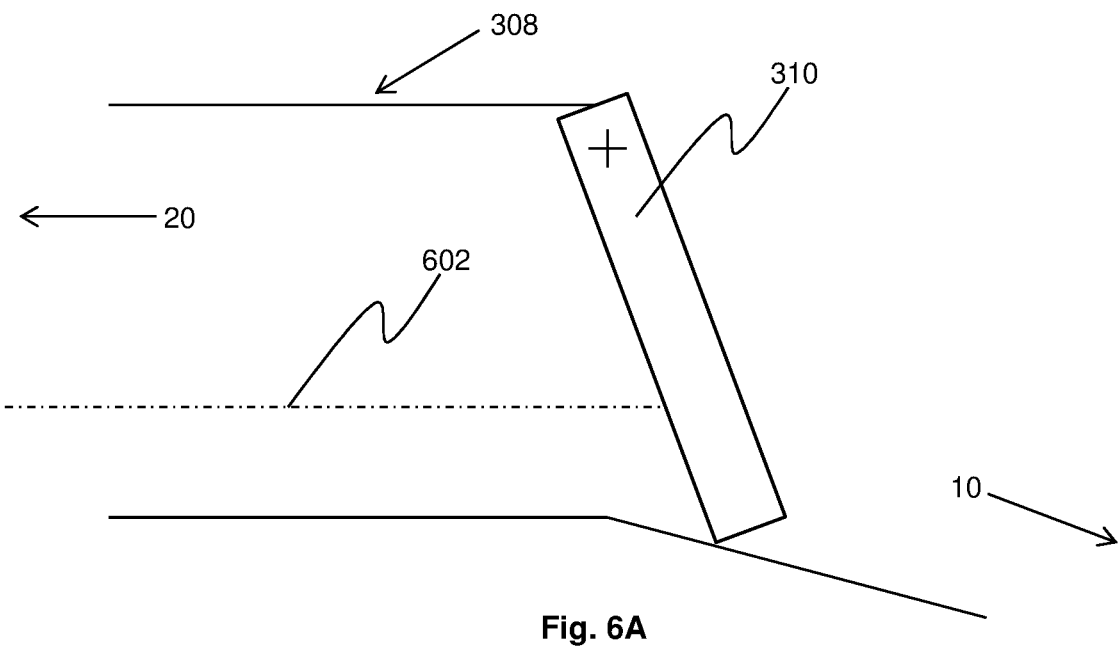
FIGS. 6A and 6B show an embodiment of a bypass flow control mechanism
Figure 6B:
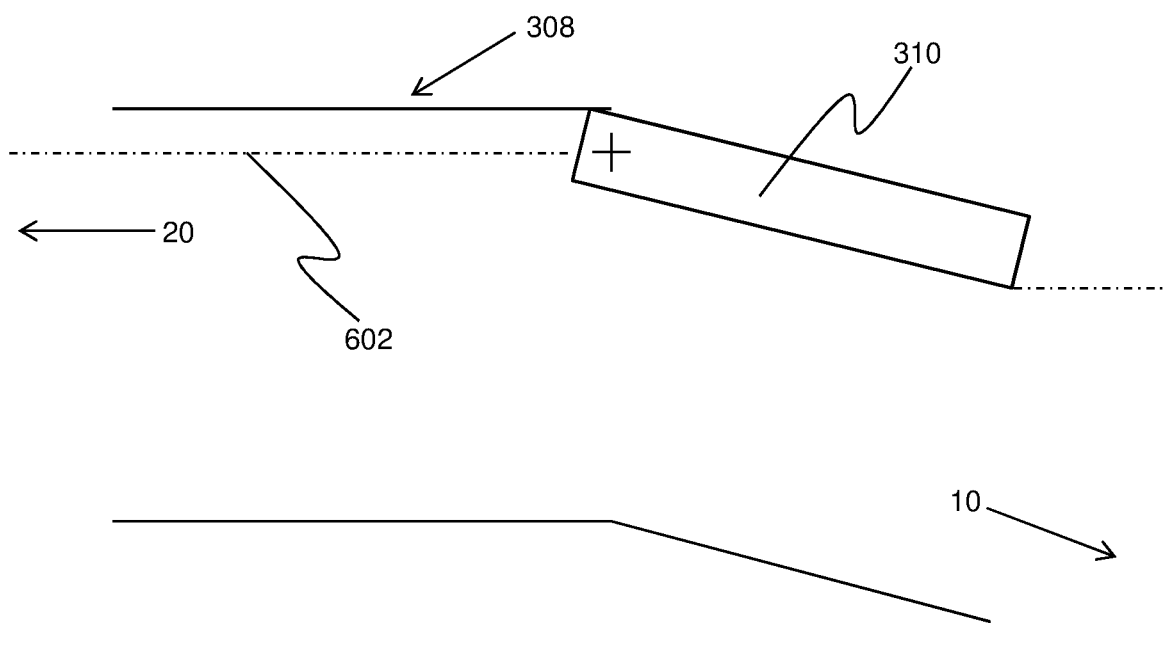

FIGS. 6A and 6B show an embodiment of a bypass flow control mechanism 310 provided on the bypass trajectory 308, comprising a valve 610. In FIG. 6A, the valve 610 is shown in a closed or substantially closed position, wherein the flow through the bypass trajectory 308 is small or even completely blocked. Such a closed position may correspond to a water level in the second body of water 20, indicated by dashed line 602, which is low.

In FIG. 6B, the is shown in an open position, in a situation which may correspond to a situation where the water level 602 in the second body of water 20 is high. With an increasing water level 602 in the second body of water 20, the water flow through the fish lock 100 may increase. If the water flow through the fish lock 100 is higher than desired, the bypass flow control mechanism 310 may be used to lower the water flow through the fish lock 100.

The bypass flow control mechanism 310 may be opened by virtue of a pressure provided by the water level 602 and/or by using an actuator device arranged for opening and/or closing the bypass flow control mechanism 310.

By manipulating the position of the bypass valve 610, the flow rate through the fish lock 100 may be controlled. For example, if the flow rate through the fish lock 100, more particularly over the flow trajectory 128, is too high, the bypass valve 310 may be opened more to decrease the flow rate and/or to control the luring flow.

The control mechanism controlling the valve 610 may be coupled to a first flow meter measuring flow through the weir to which the fish lock 100 may be placed in parallel to and/or coupled to a second flow meter measuring the total flow through the fish lock 100. The valve 610 is preferably controlled such that the total flow out of the fish lock 100, that is the luring flow and the internal flow in the fish lock, is at least 5% and preferably at least 10% of the flow through the weir or ship lock.

In another embodiment, the valve 610 is provided with a pre-determined weight such that it is self-controlling under influence of water pressure upstream of the valve 610. In particular if the fish lock 100 is placed parallel to a weir, the main flow of water through the weir is—among others— determined by the difference in height of the water levels in the two water bodies. With the valve 610 controlled by that same pressure, a proper ratio between the main flow and the luring flow may be controlled. It is noted that a weir may in such case also be controlled that there is no main flow—by pulling up the gate above the level of the highest water body. In such case, a relatively large luring flow is provided in parallel to no main flow or a small main flow, but this will still attract fish to swim into the fish lock 100, which is the objective of the luring flow.

Provided just before, at or around the second opening 106, a bridge may be provided arranged to provide a connection between the water flow entering the fish lock 100 and a place of solid ground around the second opening 106. Because of the water flow streaming into the fish lock 100 through the second opening 106, animals may be sucked into the fish lock 100. The bridge may provide animals, such as frogs, ducks or small birds, an opportunity to escape the fish lock 100 such that they can prevent ending up at the first body of water 10.

In summary, migrating fish often want to travel between different bodies of water, which may be positioned at different heights. To overcome these heights, water passages may be used that provide a water path at a slope over which a fish is able to swim up. A compact housing is provided by allowing a water guide over which the water flow flows to rotate around an axis parallel to gravity in a helical shape. The fish lock may be provided with a resting chamber which comprises a volume of water with a low flow velocity. Sensors and a controller may be provided to control a flow rate of the water through the fish lock according to for example the type of fish passing through the fish lock and an administrator may monitor the fish lock at a distance and may be contacted in case of malfunction.

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described. The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims

The invention claimed is:

1. An arrangement for guiding fish between a first lower situated body of water and a second higher situated body of water, the arrangement comprising a housing comprising:
 a first opening and a second opening, wherein in use the second opening is situated higher than the first opening; and a water guide which connects the first opening to the second opening for guiding a flow of water from the second opening through the first opening;

wherein the water guide in use provides a flow trajectory for the flow of water, the housing further comprising:
a base, and
an inner housing part, wherein the flow trajectory is within the housing and exterior to inner housing part and at least part of the base define a basin configured for containing a volume of water having a reduced velocity relative to a velocity of water in the flow trajectory, and
wherein the first opening provides an entrance configured to allow the fish into the basin.

2. The arrangement of claim 1, wherein the flow of water is around an axis parallel to a gravity vector.

3. The arrangement according to claim 1, wherein the base is arranged to in use be provided under a water level of the first body of water, and wherein the first opening is provided in the base.

4. The arrangement according to claim 3, wherein the reduced velocity of the volume of water contained in the basin is zero.

5. The arrangement according to claim 1, wherein the water guide comprises curved surfaces.

6. The arrangement according to claim 1, wherein the housing in use is arranged to provide light of a pre-determined interval of wavelengths to at least a part of an inner space of the arrangement and preferably to at least a part of the flow of water.

7. The arrangement according to claim 1, wherein at least one of the first opening and the second opening is provided with a controller arranged to control a flow through surface of the flow of water through at least one of the first opening and the second opening.

8. The arrangement according to claim 7, wherein the controller is connected to one or more sensors, and is arranged to control the flow through surface of the flow of water through the second opening based on a received output of the one or more sensors.

9. The arrangement according to claim 7, wherein the arrangement is configured for storing fish migration data, and further wherein the controller is arranged to control the flow through surface of the flow of water through the second opening based on the fish migration data.

10. The arrangement according to claim 9, wherein the controller is arranged for adjusting the fish migration data based on a received output from one or more sensors.

11. An arrangement for guiding fish between a first lower situated body of water and a second higher situated body of water, the arrangement comprising a housing comprising:
a first opening and a second opening, wherein in the use the second opening is situated higher than the first opening, and
a water guide which connects the first opening to the second opening for guiding a flow of water from the second opening through the first opening;
wherein the water guide in use provides a flow trajectory for the flow of water, and
wherein the arrangement is provided with one or more sensors arranged to determine a species of the fish swimming through the first opening.

12. The arrangement according to claim 11, wherein a controller, connected to the one or more sensors, is configured to control the flow of water through the second opening based on the species of the fish, as determined by the one or more sensors.

13. The arrangement according to claim 2, wherein the flow trajectory rotates more than 180 degrees around the axis parallel to the gravity vector.

14. The arrangement according to claim 1, wherein
the water guide is provided with one or more panels substantially perpendicular to the flow trajectory defined by the water guide, the panels comprising gates defined in the panels for passing the flow of water.

15. The arrangement according to claim 14, wherein:
the one or more gates are provided with a resilient member, wherein the resilient member at least partially defines a flow through area within the gate for the flow of water; and
the resilient member is arranged to resiliently deform under influence of a pressure provided by the flow of water.

16. The arrangement according to claim 14, wherein the one or more panels include at least a first panel comprising a first gate and a second panel comprising a second gate, wherein
the first gate is provided at or near an inner radius of the water guide; and
the second gate is provided at or near an outer radius of the water guide.

17. The arrangement according to claim 1, wherein one or both of the first opening and the second opening is provided with a controller for controlling a flow through surface for the flow of water through the one or both of the first opening and the second opening, wherein the controller is arranged to control a width of the flow through surface.

18. The arrangement according to claim 1, further comprising a bypass trajectory arranged to provide an additional flow path parallel to the water guide and through the first opening, wherein the bypass trajectory comprises a bypass flow control mechanism for controlling flow through at least part of the bypass trajectory.

19. An assembly of at least first and second arrangements according to claim 1, wherein the second opening of the first arrangement is connected to the first opening of the second arrangement, such that a flow of water is provided from the second opening of the second arrangement to the first opening of the first arrangement.

20. The arrangement according to claim 2, wherein the first opening in use is provided in a plane perpendicular to the gravity vector.

21. The arrangement of claim 1, wherein a plane of the first opening is vertical, with respect to a horizontal plane of the base.

* * * * *